United States Patent Office 2,789,361
Patented Apr. 23, 1957

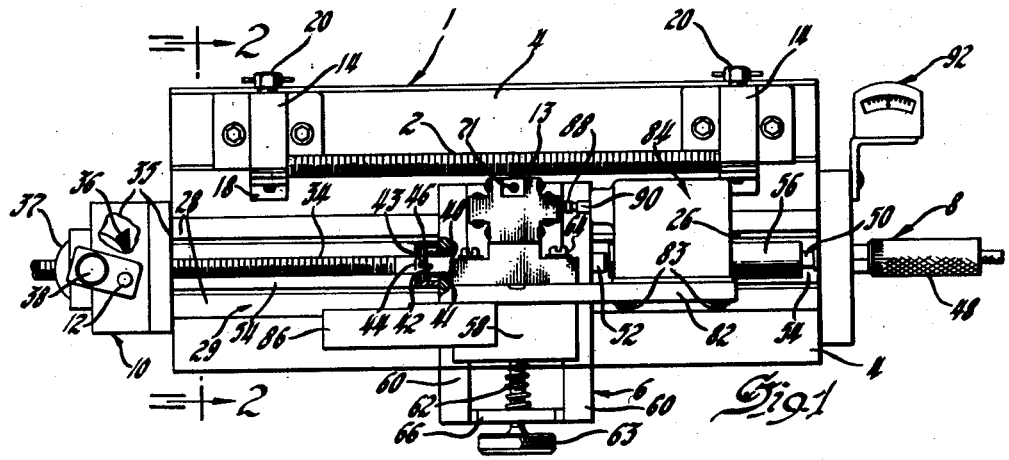

2,789,361

LEAD GAGE

Benjamin Schmittke, Flint, Mich., assignor to General Motors Corporation, Detroit, Mich., a corporation of Delaware Application October 16, 1952, Serial No. 315,101

14 Claims. (Cl. 33—199)

The present invention relates to gauges, and more particularly, to gauges for precisely comparing the lead, or pitch, of a screw thread with an object having a standard dimension.

In the manufacture of screws, it is impossible to cut a thread which has an exactly uniform pitch, or lead, over its entire length. Irregularities in the thread may result from various factors such as non-uniformity in the texture of the screw material, wearing of the cutting tool, and inaccuracies of the cutting machine. There are several devices, such as micrometers, where it is essential that the screw thread be cut as accurately as possible. Accordingly, it is necessary in the manufacture of precision screws to provide an inspection, or sampling system, to insure that the cutting process is carried out within well-defined limits. In order to provide for effective inspection, it is necessary to have a lead gauge which can rapidly and precisely measure the thread. The gauges which have been used heretofore which are capable of making the measurements with the required degree of accuracy are not only bulky and complicated in structure, but are also extremely expensive.

It is an object of the present invention to provide a gauge which is simple in construction and highly efficient in operation. Another object is to provide a novel gauge of the stated character in which a contact element is adapted to engage a screw thread, and is carried by a plurality of independent flexible reeds, or leaf springs, which permit the element to move into or out of engagement with the thread with a minimum amount of effort.

It is also an object to provide a gauge having a movable carriage and a contact element carried thereon such that the amount of movement of the contact element with respect to the carriage will indicate the variation in the pitch of the thread at that point.

These and other objects and advantages will become more apparent in the description of the embodiment shown in the accompanying drawings in which:

Fig. 1 is a plan view of the lead gauge embodying the present invention, a part thereof being broken away to show certain features.

Fig. 2 is a cross sectional view taken substantially along the plane represented by line 2—2 of Fig. 1, and Fig. 3 is a perspective view of a double reed construction suitable for suspending a platform for carrying the contact element.

Referring to the drawings in more detail, the gauge 1 for measuring a screw 2 is mounted upon an elongated bed 4. A frame 6 extends transversely of the bed 4 and is mounted for longitudinal sliding movement on the latter. Micrometer indexing means 8 are provided for placing the frame 6 at the desired point for starting a measurement and positioning means 10, which are actuated by a crank 12, moves the frame 6 along the bed 4. A contact element 13 which is adapted to engage the screw 2 is carried by the frame 6.

A pair of vertical uprights 14 are seated in a recess 16 in the bed 4. Each of the uprights 14 is provided with a clamp 18 for securing the screw 2 in position. Clamp 18 is adjusted by means of manually operable bolt 20. When the bolts 20 are tightened, the clamps 18 will force the screw 2 under examination into the tapering notches 24 provided in uprights 14. Thus, the screw 2 will be rigidly retained in place throughout the examination.

A recessed channel 26 extends longitudinally of the bed 4 which receives the correspondingly shaped depending portion 27 of frame 6. Flat bearing portions 28 on bed 4 at either side of channel 26 form a track 29 which slidably receives the flat bearing portions 30 provided on frame 6 and thereby provides a slidable support for the said frame over the length of the said bed.

Positioning means 10 include a threaded shaft 34 which is mounted for axial movement through a gear housing 35. Shaft 34 engages the internal threads provided in the central bore of a beveled gear 36 secured against axial movement in housing 35. Bevel gear 36 is actuated by a second beveled gear 37 secured to a vertical shaft 38 journaled in housing 35. Hand crank 12 is secured to the upper end of shaft 38. Thus upon turning crank 12 gears 36 and 37 will cause the shaft 34 to move axially to actuate frame 6 along the track 29 on bed 4. To reduce the possibility of error arising from failure to properly position the frame 6, spring means 40 are provided. Spring 40 which surrounds the unthreaded portion of shaft 34 is disposed in a recess 41 provided in frame 6. One end of spring 40 engages a collar 42 that is secured to shaft 34 by pin 43. The other end of spring 40 engages the inner wall of recess 41. A line mark 44 is provided on the shaft 34 to indicate the tension of spring 40. As shown in Figs. 1 and 2 a housing extension is secured to frame 6 in line with recesses 41 by bolts 47 and has an opening in the outer wall thereof for receiving shaft 34. When mark 44 is flush with the exterior of housing 46, the pressure of spring 40 is sufficient to urge the frame 6 into place. This in turn insures that the frame 6 consistently engages its neighboring parts with a uniform force.

The end of bed 4 opposite positioning means 10 may have an indexing means 8 for properly positioning the frame 6 preparatory to measuring the screw 2. Index 8 includes a micrometer 48 having a spindle 50 thereon, which extends into the channel 26 and is engageable with a button 52 projecting from the side of frame 6.

In addition to indexing means 8, a raised projection 54 is provided on the bottom of channel 26 to form a base for an object 56 such as a Johansson block of standard dimension. When the standard object 56 is in position, and positioning means 10 are properly adjusted, the button 52 on the frame 6 and the spindle 50 will be in engagement with the opposite ends of object 56.

A carriage 58 comprising a base portion 59 is slidably mounted on frame 6 by means of a track 60 which is disposed in a direction substantially perpendicular to the screw thread 2. Carriage 58 is actuated along track 60 by screw shaft 62 having a knurled handle 63 on one end thereof. The nonthreaded outer end of shaft 62 is rotatably mounted in the bearing provided in cross member 66 of frame 6. The inner end of screw shaft 62 engages the internally threaded bore of base portion 59 of carriage 58. Thus by turning shaft 62 carriage 58 may be moved towards or away from screw shaft 2.

Carriage 58 has secured thereto by bolts 64 a relatively flat inwardly extending support 65 for special mounting means 67 supporting the thread contact element 13. The contact element 13 is seated in a bore 68 extending through the lower platform 70 of mounting means 67 and is held in position by set screw 71.

The movement of the contact element 13 with respect to the carriage 58 is determined by measuring the shifting of platform 70 with respect to support 65. Therefore, it is essential that platform 70 be supported for translational movement only. This is accomplished by suspending platform 70 from a second platform 72 which in turn is supported by support 65. As shown more particularly in Fig. 3 a plurality of spaced support members 73 connect upper platform 72 to support 65. Each member 73 comprises a flexible reed or leaf spring which is resiliently deflectable in one plane and relatively rigid in planes normal thereto. Members 73 are secured by screws or other means to the vertically aligned sides of extensions 75 and 76 provided on support 65 and platform 72 so that they all will bend only in parallel planes. In the present instance this is in a direction substantially perpendicular to the axis of screw 2. A second set of spaced parallel support members 80 connect platforms 70 and 72. Each member 80 is deflectable in one plane and relatively rigid in planes normal thereto. The planes of deflection of the two sets are at substantially right angles. The members 80 are secured to vertically aligned faces on platforms 70 and 72 by screws or other means and it will be observed they are deflectable in a direction substantially parallel to the axis of screw 2. Since all of the second set of members 80 are deflectable in substantially parallel planes, the platform 70 must move in a straight line with respect to platform 72. However, since this direction is substantially normal to the line of travel of the platform 72, platform 70 may be translated either parallel with or at right angles to the carriage 58. Thus rotary or twisting movement of platform 70 is prevented.

An elongated transverse support 82 is secured to the frame of carriage 58 by the screws 64 and has secured near one end thereof by bolts 83 a measuring device 84. To balance the weight of the device 84 and to prevent binding of the carriage 58 on frame 6, to the opposite end of the support a counterweight 86 is secured. The measuring device 84, which moves with the carriage 58, engages a button 88 projecting from one side of the platform 70. Upon movement of platform 70 parallel to the axis of the thread 2 and relative to support 65, the button 88 will operate the measuring device 84, which in turn indicates the amount of relative movement between the support 65 and platform 70 and consequently of screw thread contact element 13.

Although any suitable form of measuring device 84 may be employed, an electronic measuring or magnifying head has been found to be very effective. Such a head may comprise any one of the commercially available units in which movement of the pin 90 will unbalance a bridge circuit and cause a reading to appear on the meter 92. The meter 92 may be calibrated directly to read the amount of deflection of the lower platform 70 with respect to the carriage 58 if desired. By employing a sliding contact between the button 88 and the pin 90, contact element 13 may move in a direction perpendicular to the axis of the thread 2 without altering the measuring device 84.

To utilize the gauge 1, the screw 2 is placed in the jaws 22 of the vertical uprights 14, and the bolts 20 are tightened, thus holding the screw 2 in a fixed position. The frame 6 is then moved longitudinally of bed 4 by turning the crank 12 until the contact element 13 assumes a position adjacent a point on screw 2 suitable for starting the measurement. The index means 8 is then adjusted until the spindle 50 engages the button 52 on carriage 58. The crank 12 is again adjusted until the mark 44 on the shaft 34 is flush with the exterior of the housing 46. The knurled knob 63 is then adjusted to move carriage 58 transversely of bed 4 until the contact element 13 is seated in the root of thread 2. The micrometer 48 is now again adjusted so as to move the frame 6 until a zero reading appears on the meter whether the contact element 13 is in or out of engagement with thread 2. This means that the platform 70 is not displaced laterally as the contact element 13 comes into engagement with the thread 2. It should be noted that whenever an adjustment is made on the micrometer 48, it may be necessary to readjust threaded shaft 34 until the mark 44 is flush with the external surface of the housing 46. After the frame 6 has been adjusted so that a zero reading is indicated whether a contact element 13 is seated in the thread 2 or moved therefrom the index 8 is locked into position. Index 8 will not be moved during the remainder of the measurement. Contact element 13 is then withdrawn from the thread 2 by turning knob 63. After the element 13 is free of the thread 2 the frame 6 is moved to the left by rotating crank 12, and the standard measuring object such as a Johansson block 56 is placed upon the raised portion 54 on channel 26. The frame is then moved to the right until the button 52, extending outwardly therefrom, engages the Johansson block 56 and the other end of the block engages the spindle 50 of micrometer 48. As a matter of convenience the length of the Johansson block may be chosen as some whole multiple of the pitch of the standard thread. At the same time shaft 34 is adjusted to cause the mark 44 thereon to be flush with the exterior of housing 46 thereby subjecting spring 40 to compression which action resiliently holds the carriage in engagement with block 56. When the parts have been adjusted as just described, the knurled knob 63 is turned until the contact point 13 is again inserted in the root of said thread 2. As contact element 13 moves into the thread, if any variation is present between the length of block 56 and the measured length of screw 2 the said element will be moved by the thread 2, thereby causing translation of platform 70 to the right or left, as the case may be. This movement of platform 70 will cause the pin 90 extending outwardly from measuring device 84, to be pushed into or further extended from said device, which movement, as previously described, causes an unbalanced condition of the bridge circuit, thereby registering a corresponding reading of the meter 92. This will indicate the variation between the measured length of the screw and the length of the standard gage block 56. A rapid measurement is thus effected from which correction may be readily made in the cutting tool to correct the error or variation and cause a screw thread to be cut which is in exact conformity with the standard.

While but one embodiment of the present invention has been shown, it will be apparent to those skilled in the art that various changes and modifications may be made without departing from the invention. It is, therefore, to be understood that it is not intended to limit the invention to the single embodiment disclosed herein, but only by the claims which follow.

I claim:

1. A gauging device comprising a support, a first member deflectable in one plane and relatively rigid in planes normal thereto and having one end thereof secured to said support, a second member deflectable in one plane and relatively rigid in planes normal thereto, said second member having one end thereof secured to the other end of said first member such that said members are parallel and deflectable in planes normal to each other, and a contact element supported by the other end of said second member.

2. A mounting device for the contact element of a measuring gauge, comprising a support, a member disposed in spaced relation with said support, a plurality of reeds each of which is deflectable in one direction and relatively rigid in a direction normal thereto, said reeds connecting said member to said support, a second member disposed between said support and said first member, a second group of reeds connecting said first and second members, said second group of reeds being deflectable only in a direction substantially normal to the direction of deflection of said first group of reeds, and a contact element carried by said second member.

3. A gauge comprising a support, a first set of reeds comprising a plurality of reeds each of which is deflectable in one plane and relatively rigid in planes normal thereto and have one end thereof secured to said support such that they will be deflectable in substantially parallel planes, a second set of reeds comprising a plurality of reeds each of which is deflectable in one plane and relatively rigid in planes normal thereto and have one end thereof supported by the other end of said first reeds such that the second set of reeds will be deflectable in planes substantially normal to the plane of deflection of said first set of reeds, and a contact element supported by the other end of said second reeds.

4. A gauging device comprising a support, a first member deflectable in one plane and relatively rigid in a plane normal thereto and having one end thereof secured to said support, an element supported by the other end of said first member, said member being sufficiently long compared to the normal movement of said element to cause said element to move in a substantially straight line with respect to said support, a second member deflectable in one plane and relatively rigid in a plane normal thereto and having one end thereof secured to said element, said second member being sufficiently long compared to the normal movement thereof that the other end thereof will be lineally deflectable in a plane normal to the plane of deflection of said first member, and a contact carried by the other end of said second member.

5. A gauging device comprising a support, a first set of flexible reeds, each of said reeds being deflectable in substantially parallel planes and relatively rigid in planes normal thereto and having one end thereof secured to said support such that they will be deflectable in substantially parallel planes, an element supported by the other ends of said reeds such that it can move in a straight line with respect to said support, a second set of reeds resiliently deflectable in substantially parallel planes and relatively rigid in planes normal thereto and having one end thereof secured to said element such that the planes of deflection of said first set of reeds will be substantially normal to the planes of deflection of said second set of reeds, and a member carried by the other end of said second set of reeds whereby said member will be permitted translatory motion with respect to said support, and a contact element supported by said member.

6. A gauging device comprising a carriage having a supporting portion thereon, a first set of leaf springs resiliently deflectable in substantially parallel planes and relatively rigid in planes normal thereto and having one end thereof secured to said supporting portion, an element secured to the other end of said set of leaf springs, a second set of leaf springs resiliently deflectable in substantially parallel planes and relatively rigid in planes normal thereto and having one end thereof secured to said element such that the planes of deflection of said second set of springs will be substantially normal to the planes of deflection of said first set of springs, a member carried by the other end of said second set of leaf springs whereby said member will be permitted translation with respect to said carriage, a contact supported by said member, and means for measuring the amount of translation of said contact with respect to said carriage.

7. A gauge adapted to compare the dimensions of one object with those of another object, comprising a frame, clamping means on said frame adapted to hold said first object, a carriage mounted on said frame and adapted to be moved thereon a distance corresponding to the dimension of said second object, first support means mounted on said carriage and moveable in a straight line with respect to said carriage, second support means carried by said first support means and movable only in a direction normal to said first support means, a contact element adapted to engage said first object and be carried by said support means whereby said contact element may be translated with respect to said carriage, and means for determining the amount of such movement of said element with respect to said carriage.

8. A gauge adapted to compare the dimensions of one object with those of another object, comprising a frame, clamping means on said frame adapted to hold said first object, a carriage mounted on said frame and adapted to be moved thereon a distance corresponding to the dimension of said second object, a first member having one end thereof secured to said carriage and deflectable in one plane only, a second member having one end thereof secured to said first member substantially parallel thereto and deflectable only in a plane normal to said first plane, a contact element carried by the other end of said second member and adapted to engage said first object, and means for determining the amount of movement of said element with respect to said carriage.

9. A gauge adapted to compare the dimensions of one object with those of another object and comprising a frame, clamping means on said frame adapted to hold said first object, a carriage mounted on said frame and adapted to be moved thereon a distance corresponding to the dimension of said second object, a first reed resiliently deflectable in one plane and substantially rigid in a plane normal thereto and having one end thereof secured to said carriage, a second reed resiliently deflectable in one plane and relatively rigid in a plane normal thereto and having one end thereof secured to the other end of said first reed such that the planes of deflection of said reeds will be substantially normal to each other, said reeds being substantially parallel to each other, a contact element carried by the other end of said second reed, and means for measuring the relative movement of said contact element with respect to said carriage.

10. A gauge adapted to compare the dimensions of one object with those of another object and comprising a frame, clamping means on said frame adapted to hold said first object, a carriage mounted on said frame and adapted to be moved thereon a distance corresponding to the dimension of said second object, a first set of reeds comprising a plurality of reeds each of said reeds being resiliently deflectable in one plane and relatively rigid in a plane normal thereto, and having one end thereof secured to said carriage such that the planes of deflection of said reeds will be substantially parallel, a second set of reeds, each of said reeds being resiliently deflectable in one plane and relatively rigid in a plane normal thereto and having one end thereof supported by the other ends of said first set of reeds such that the planes of deflections of said first and second sets of reeds will be substantially normal to each other, a platform carried by the other end of said second set of reeds, a contact element on said platform adapted to engage said first object, and means for determining the amount of movement of said platform with respect to said carriage.

11. A gauge adapted to compare the dimensions of one object with those of another object and comprising a frame, clamping means on said frame adapted to hold said first object, a carriage mounted on said frame and adapted to be moved thereon a distance corresponding to the dimension of said second object, a first set of leaf springs having one end thereof secured to said carriage such that said leaf springs will be deflectable in substantially parallel planes, a second set of leaf springs having one end thereof supported by the other end of said first set of leaf springs such that said second set will be deflectable in planes substantially normal to the planes of deflection of said first set, a platform carried by the other end of said second set of leaf springs, a contact element carried by said platform and means for determining the amount of movement of said platform with respect to said carriage.

12. A measuring gauge for accurately determining variation in the length of a member with respect to a member of known length comprising a fixed support, means provided on said support for clamping an object to be measured in position, a carriage mounted on said support and adapted for movement in a direction parallel to said object under test and transversely thereof, a contact element carried by said carriage and adapted to engage said object, means for resiliently supporting said contact element for relative movement with respect to said carriage in directions parallel with respect to said object to be measured and at right angles thereto, said mounting means comprising a member supported for translational movement relative to said support in one direction only, a second member supported by said first mentioned member for translational movement in a direction substantially normal to the direction of movement of said first mentioned member, means for securing said contact element on said second member, and indicating means actuated by said second member upon movement thereof in either direction parallel to said object to indicate the extent of variation between the length of said object to be measured with said member of known length.

13. A measuring gauge for accurately determining variation in the length of a member with respect to a member of known length comprising fixed support, means provided on said support for clamping an object to be measured in position, a carriage mounted on said support and adapted for movement in a direction parallel to said object under test and transversely thereof, a contact element carried by said carriage and adapted to engage said object under test, means for resiliently supporting a contact element for relative movement with respect to said carriage in directions parallel with the said object to be measured and at right angles thereto, said mounting means comprising a member supported for translational movement of said support in one direction only and a second member supported by said first mentioned member for translational movement in a direction substantially normal to the direction of movement of said first mentioned member, indicating means actuated by said second member upon movement thereof in either direction parallel to said object to indicate the extent of variation between the length of said object to be measured with said member of known length, means for actuating said carriage longitudinally of said support, and additional means for actuating said carriage transversely of said support.

14. A measuring gauge for accurately determining the variation in length of a member with respect to a member of known length comprising fixed support, means provided on said support for clamping an object to be measured in position, a carriage mounted on said support and adapted for movement in a direction parallel to said object under test and transversely thereof, a contact element carried by said carriage and adapted to engage said object under test, means for resiliently supporting a contact element for relative movement with respect to said carriage in directions parallel with the said object to be measured and at right angles thereto, said mounting means comprising a member supported for translational movement of said support in one direction only and a second member supported by said first mentioned member for translational movement in a direction substantially normal to the direction of movement of said first mentioned member, indicating means actuated by said second member upon movement thereof in either direction parallel to said object to indicate the extent of variation between the length of said object to be measured with said member of known length, means for actuating said carriage longitudinally of said support, additional means for actuating said carriage transversely of said support, and micrometer means for adjusting said carriage with respect to said object being measured to adjust said indicating means to indicate zero reading at the starting point in the measurement of said object.

References Cited in the file of this patent

UNITED STATES PATENTS

| | | |
|---|---|---|
| 1,956,812 | Smith | May 1, 1934 |
| 2,216,796 | Aller | Oct. 8, 1940 |
| 2,321,903 | Fox | June 15, 1943 |
| 2,392,301 | Aller | Jan. 8, 1946 |
| 2,443,858 | Hughes | June 22, 1948 |
| 2,453,098 | Powers | Nov. 2, 1948 |
| 2,547,719 | Rosser | Apr. 3, 1951 |
| 2,639,509 | Rinker | May 26, 1953 |

FOREIGN PATENTS

| | | |
|---|---|---|
| 246,288 | Switzerland | Sept. 16, 1947 |